US006671828B1

(12) United States Patent
Tursich

(10) Patent No.: US 6,671,828 B1
(45) Date of Patent: Dec. 30, 2003

(54) ADDRESS ROUTING IN A PROTOCOL ANALYZER

(75) Inventor: Stephen Tursich, Peyton, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 523 days.

(21) Appl. No.: 09/592,219

(22) Filed: Jun. 12, 2000

(51) Int. Cl.[7] .................................................. G06F 11/25
(52) U.S. Cl. ............................ 714/39; 714/4; 709/224
(58) Field of Search ....................... 714/39, 4; 709/224

(56) References Cited

U.S. PATENT DOCUMENTS

| | | | | |
|---|---|---|---|---|
| 5,572,533 A | * | 11/1996 | Sunada et al. | 370/241 |
| 5,648,965 A | * | 7/1997 | Thadani et al. | 370/241 |
| 5,787,085 A | * | 7/1998 | Fox | 370/392 |
| 5,850,388 A | * | 12/1998 | Anderson et al. | 370/252 |
| 5,907,550 A | * | 5/1999 | Hontz | 370/389 |
| 6,058,112 A | * | 5/2000 | Kerstein et al. | 714/712 |
| 6,269,330 B1 | * | 7/2001 | Cidon et al. | 714/43 |
| 6,304,903 B1 | * | 10/2001 | Ward | 709/224 |
| 6,453,345 B2 | * | 9/2002 | Trcka et al. | 709/224 |

* cited by examiner

Primary Examiner—Scott Baderman
Assistant Examiner—Anne L. Damiano

(57) ABSTRACT

A protocol analyzer for a test system has a control system coupled to a first interface and a second interface. The first interface receives a packet from a packet network. The control system receives the packet from the first interface and either deletes the packet or transfers the packet to the second interface based on a destination address in the packet. The second interface transfers the packet to another protocol analyzer. The destination address could be a MAC address.

23 Claims, 5 Drawing Sheets

ADDRESS ROUTING IN A PROTOCOL ANALYZER

BACKGROUND OF THE INVENTION

1. Field of the Invention

The invention is related to the field of packet routing, and in particular, to a protocol analyzer that deletes packets or routes packets to other protocol analyzers based on destination addresses.

2. Statement of the Problem

The demand for communication network services is growing dramatically and there is a corresponding growth in the need for communication test systems. A common test system uses protocol analyzers to monitor traffic on communication links in a communication network. The protocol analyzers process the traffic to produce test packets that are transferred to a test computer. The test computer processes the test packets to produce test results for communication network operators. The test computer also transfers test packets to the protocol analyzers to control testing. As the communication network grows, so does the number of protocol analyzers and test packets that are needed to monitor the network traffic.

In some test systems, the protocol analyzers are daisy-chained together. The protocol analyzer at the end of the daisy-chain is connected to a packet network. The packet network is connected to the test computer. The packet network exchanges the test packets between the protocol analyzers and the test computer, but the packet network also transfers other packet traffic that can get into the daisy-chain. In some cases, the test packets only represent a small percentage of the total traffic within the packet network. To avoid processing the other packet traffic, the protocol analyzers only process packets that contain their respective Media Access Control (MAC) address in the destination field.

Increased traffic within the daisy-chain adversely affects the performance of the test system by slowing down communications between the protocol analyzers and the test computer. The traffic increase is due in part to the increased number of protocol analyzers within the daisy-chain, but the traffic increase is also due to the increased amount of other packet traffic within packet network.

To lower the packet traffic within the daisy-chain, the protocol analyzer at the end of the daisy-chain is connected to the packet network through a device, such as a router or hub. The device prevents the other packet traffic from entering the daisy-chain. Unfortunately, the device represents additional cost and complexity that is required for the test system.

To avoid the additional device, routing software or hub circuitry can be added to the protocol analyzer at the end of the daisy-chain. The software router requires additional processing capacity within the protocol analyzer and additional network provisioning by the network operator. The hub circuitry requires additional components and connectors in the protocol analyzer. Unfortunately, the software router or hub circuitry significantly increases the cost and complexity of the protocol analyzer.

SUMMARY OF THE SOLUTION

The invention solves the above problem with a cost-effective test system that controls the traffic in a daisy-chain of protocol analyzers. The test system screens packets entering the daisy-chain based on the destination addresses in the packets. Advantageously, the system is implemented with simple control processing that does not add significant cost or complexity to the packet network or to the protocol analyzers.

Some examples of the invention include a protocol analyzer that has a control system coupled to a first interface and a second interface. In operation, the first interface receives a packet from a packet network. The control system receives the packet from the first interface and either deletes the packet or transfers the packet to the second interface based on a destination address in the packet. The second interface transfers the packet to another protocol analyzer.

In variations of the invention, the control system may transfer the packet to the second interface if the destination address is on an address list. The address list may be compiled from source addresses in other packets received by the second interface.

The control system may also transfer the packet to the second interface if the destination address is within an address range.

DETAILED DESCRIPTION OF THE INVENTION

Figure 1:
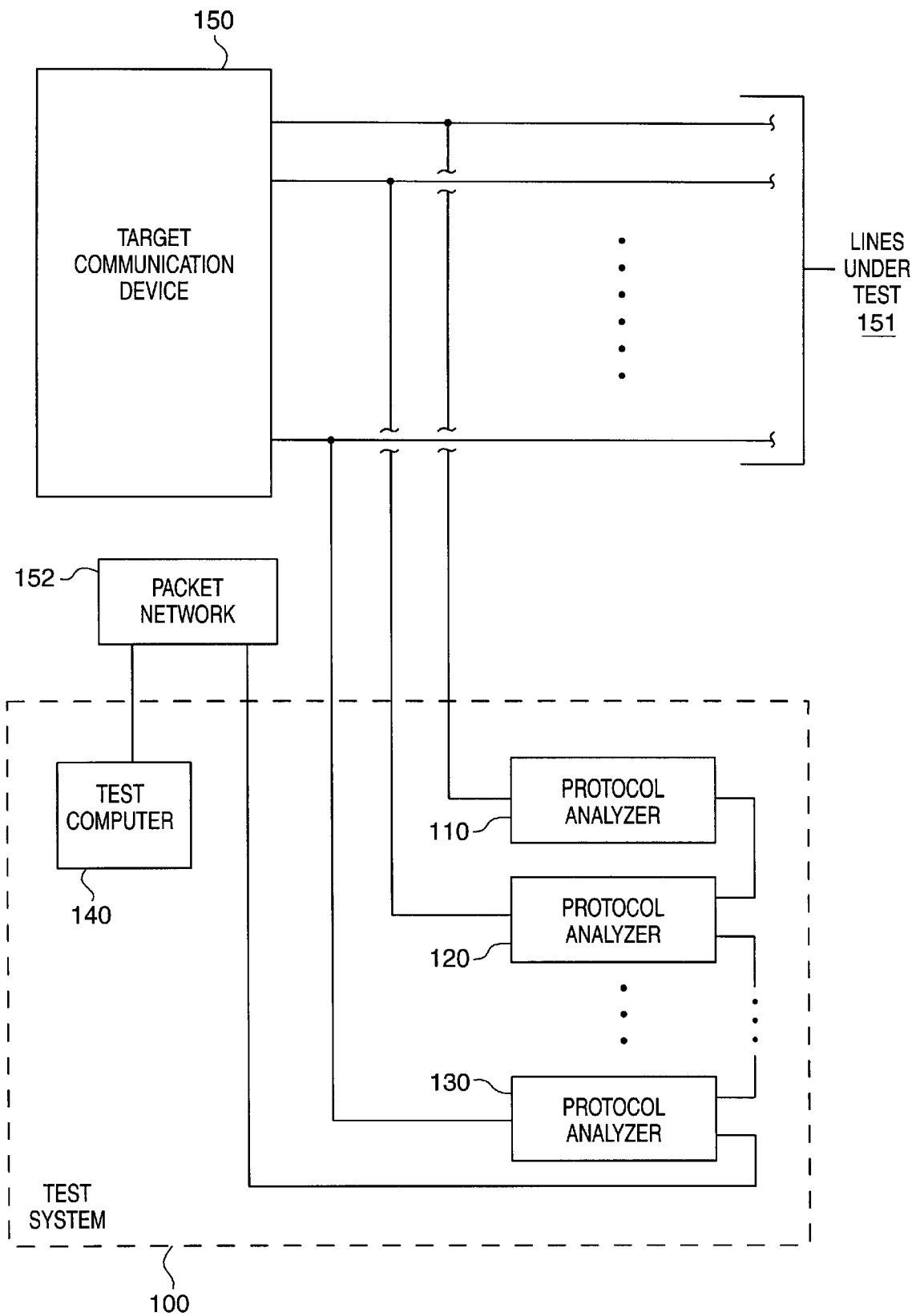
FIG. 1 is a block diagram that illustrates a test system in an example of the invention.
Figure 2:
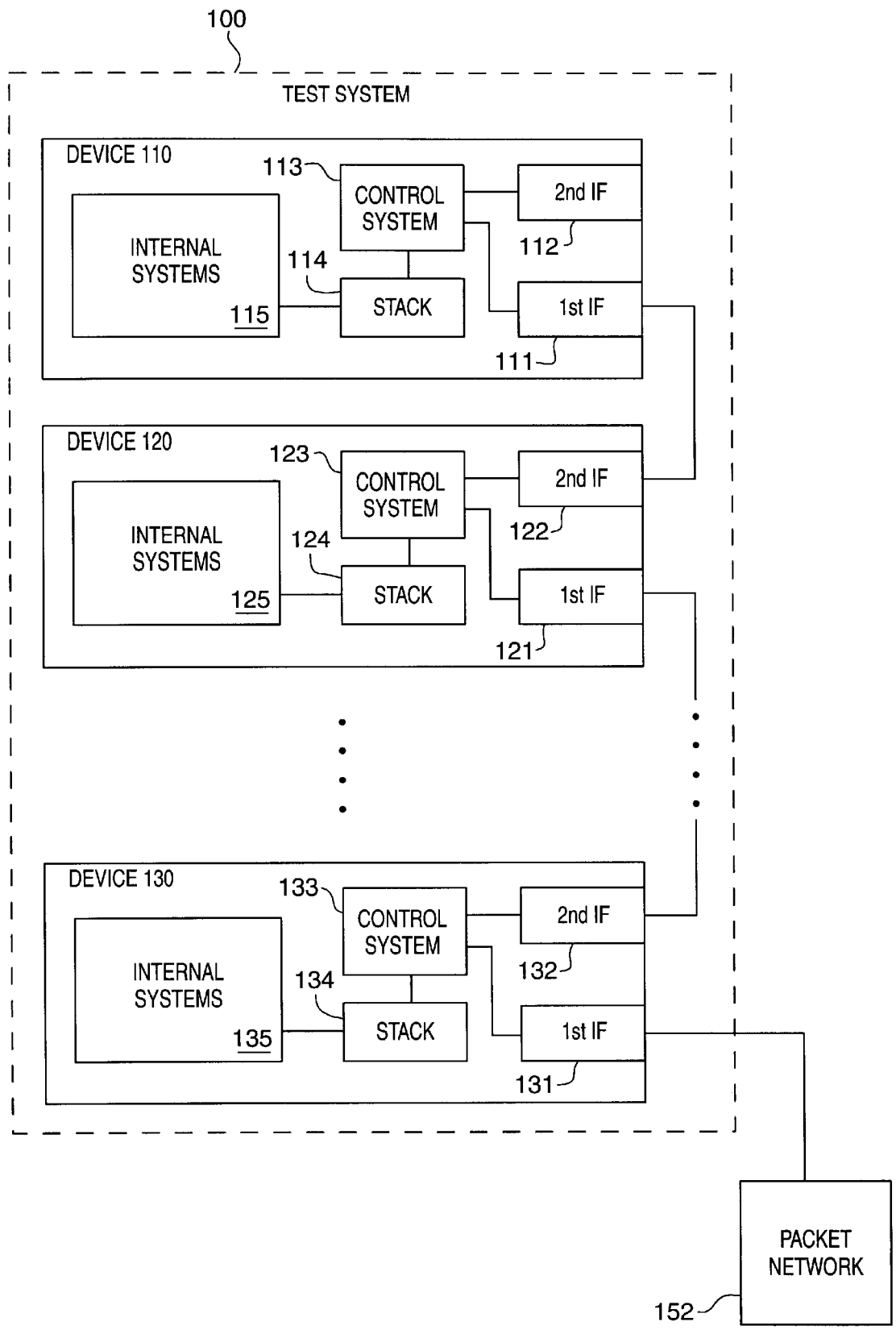
FIG. 2 is a block diagram that illustrates protocol analyzers in an example of the invention.

Test System Configuration and Operation—FIGS. 1–2

FIGS. 1–2 depict a specific example of a test system in accord with the present invention. Those skilled in the art will appreciate numerous variations from this example that do not depart from the scope of the invention. Those skilled in the art will also appreciate that various features described below could be combined to form multiple variations of the invention.

FIG. 1 illustrates test system 100 coupled to lines-under-test 151 of target communication device 150. Test system 100 comprises protocol analyzer 110, protocol analyzer 120, protocol analyzer 130, and test computer 140. Additional protocol analyzers are indicated by the ellipses, but are not shown for clarity. Protocol analyzers 110, 120, and 130 are daisy-chained together. Protocol analyzer 130 is connected to test computer 140 through packet network 152. In some examples of the invention, protocol analyzer 130 is coupled to test computer 140 through both packet network 152 and target communication device 150.

Protocol analyzers 110, 120, and 130 monitor traffic on lines-under-test 151 to generate and transfer test packets to test computer 140. Test computer 140 processes the test packets to generate test results regarding target communication device 150 for network operators. Test computer 140 also transfers test packets to protocol analyzers 110, 120, and 130 to control testing. Protocol analyzer 130 receives the test packets from test computer 140. Protocol analyzer 130 also receives other packets carried by packet network 152. Protocol analyzer 130 processes some packets internally, transfers some packets to protocol analyzers 110 and 120, and deletes the other packets.

In some examples of the invention, protocol analyzer 130 transfers a packet to protocol analyzers 110 and 120 if the packet is a certain packet type or if the packet's destination MAC address is on a list or within a range. Protocol analyzer may compile the address list using source MAC addresses in packets from the daisy-chain. Test computer 140 may transfer and modify the address list or range in protocol analyzer 130. Test computer 140 may also transfer and modify the packet types that can be passed to the daisy-chain.

FIG. 2 illustrates protocol analyzers 110, 120, and 130 in an example of the invention. Protocol analyzer 130 comprises first interface 131, second interface 132, control system 133, protocol stack 134, and internal systems 135. Control system 133 is coupled to interfaces 131-132 and to protocol stack 134. Protocol stack 134 is coupled to internal system 115. Internal systems 135 represent the other operational components of protocol analyzer 130. Those skilled in the art are familiar with internal systems 135.

Protocol stack 134 exchanges information with internal systems 135 and exchanges packets containing the information with control system 133. Interfaces 131–132 communicate with external communication links to exchange packets between the external communication links and control system 133. Control system 133 includes processing and memory circuitry that direct the exchange of packets. Control system 133 operates based on instructions stored in memory.

Protocol analyzer 110 comprises first interface 111, second interface 112, control system 113, protocol stack 114, and internal systems 115. Protocol analyzer 120 comprises first interface 121, second interface 122, control system 123, protocol stack 124, and internal systems 125. These components are connected and operate as described for the corresponding components of protocol analyzer 130.

Protocol analyzers 110, 120, and 130 are daisy-chained together as follows. First interface 111 is coupled to second interface 122. First interface 121 is coupled to the second interface of the next device represented by the ellipses. The devices represented by the ellipses are connected in a similar fashion, and the first interface in the last device represented by the ellipses is coupled to second interface 132. First interface 131 is coupled to packet network 152.

Control system 133 in protocol analyzer 130 receives packets from packet network 152. Control system 133 passes a packet to the daisy-chain if the packet is needed by a device in the daisy-chain. Control system 130 could use various techniques to pass the packets. For example, control system 130 may pass packets with certain packet types. In some examples of the invention, devices on the daisy-chain are configured with MAC addresses within a given range, and control system 130 passes packets with destination MAC addresses that are within the range. In some examples of the invention, control system 130 maintains a list of MAC addresses and passes packets with destination MAC addresses that are on the address list. The address list is compiled from the MAC addresses in the source field of packets that are received from the daisy-chain. Thus, the address list includes devices in the daisy-chain that send packets to packet network 152.

Protocol analyzers 110 and 120 are connected to packet network 152 through protocol analyzer 130. Protocol analyzers 110 and 120 do not need the screening function of protocol analyzer 130 and may simply keep packets that are addressed to them and transfer other packets up or down the chain. Protocol analyzers 110 and 120 may also process packets of a certain type, such as broadcast packets. If desired, protocol analyzers 110 and 120 could be configured with the screening function, so all protocol analyzers have the same general configuration.

Figure 3:
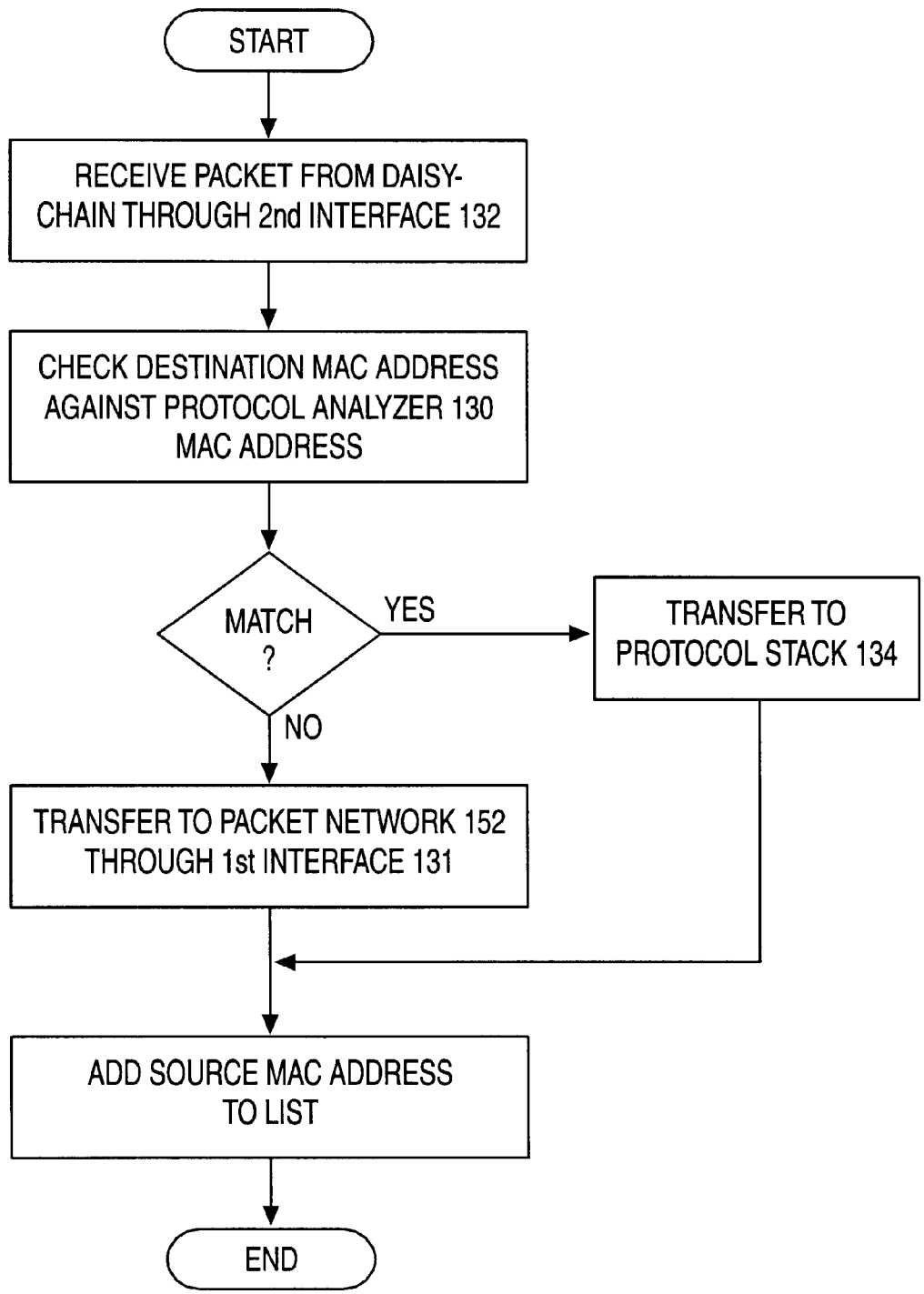
FIG. 3 is a flow diagram that illustrates the operation of a protocol analyzer in an example of the invention.
Figure 4:
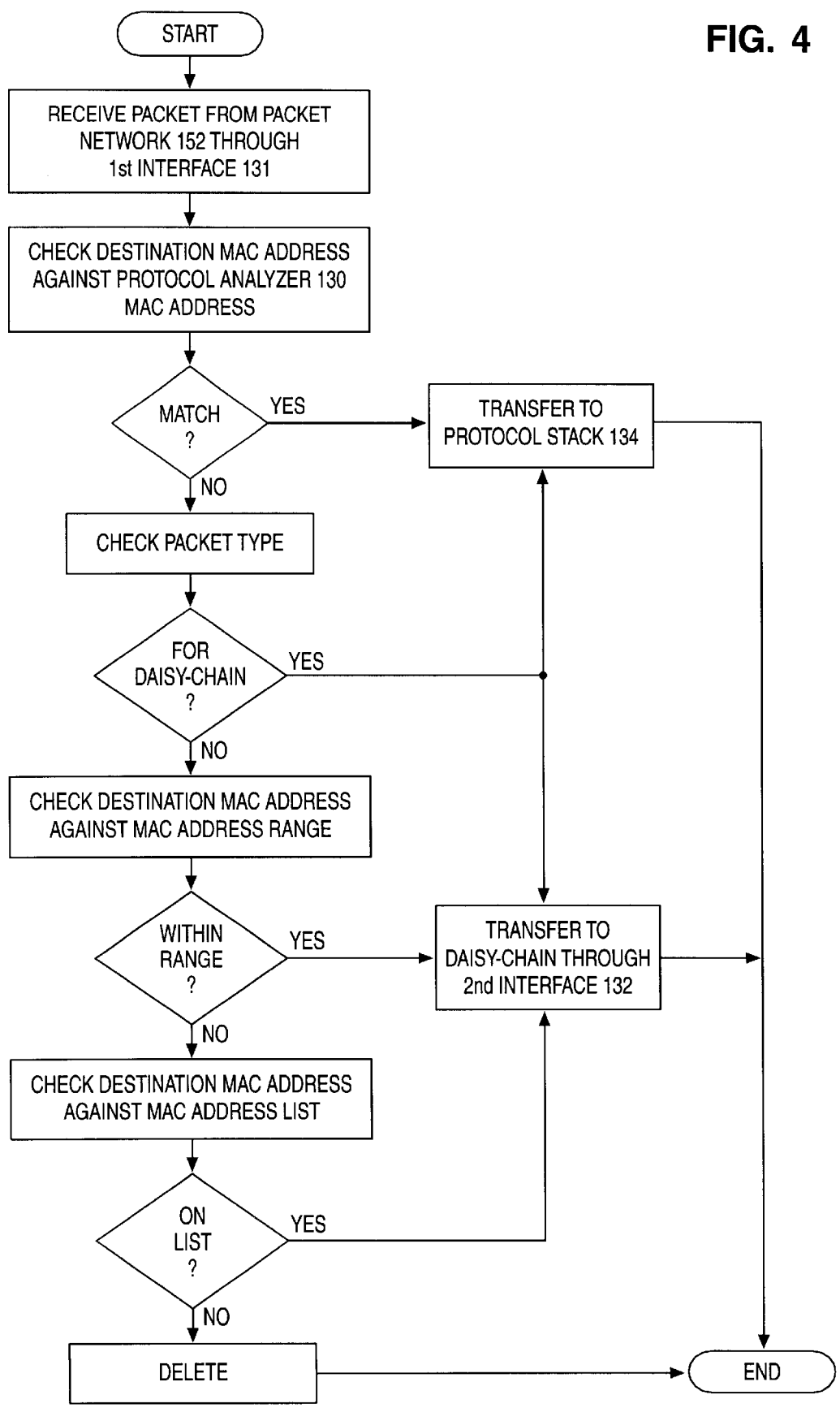
FIG. 4 is a flow diagram that illustrates the operation of a protocol analyzer in an example of the invention.
Figure 5:
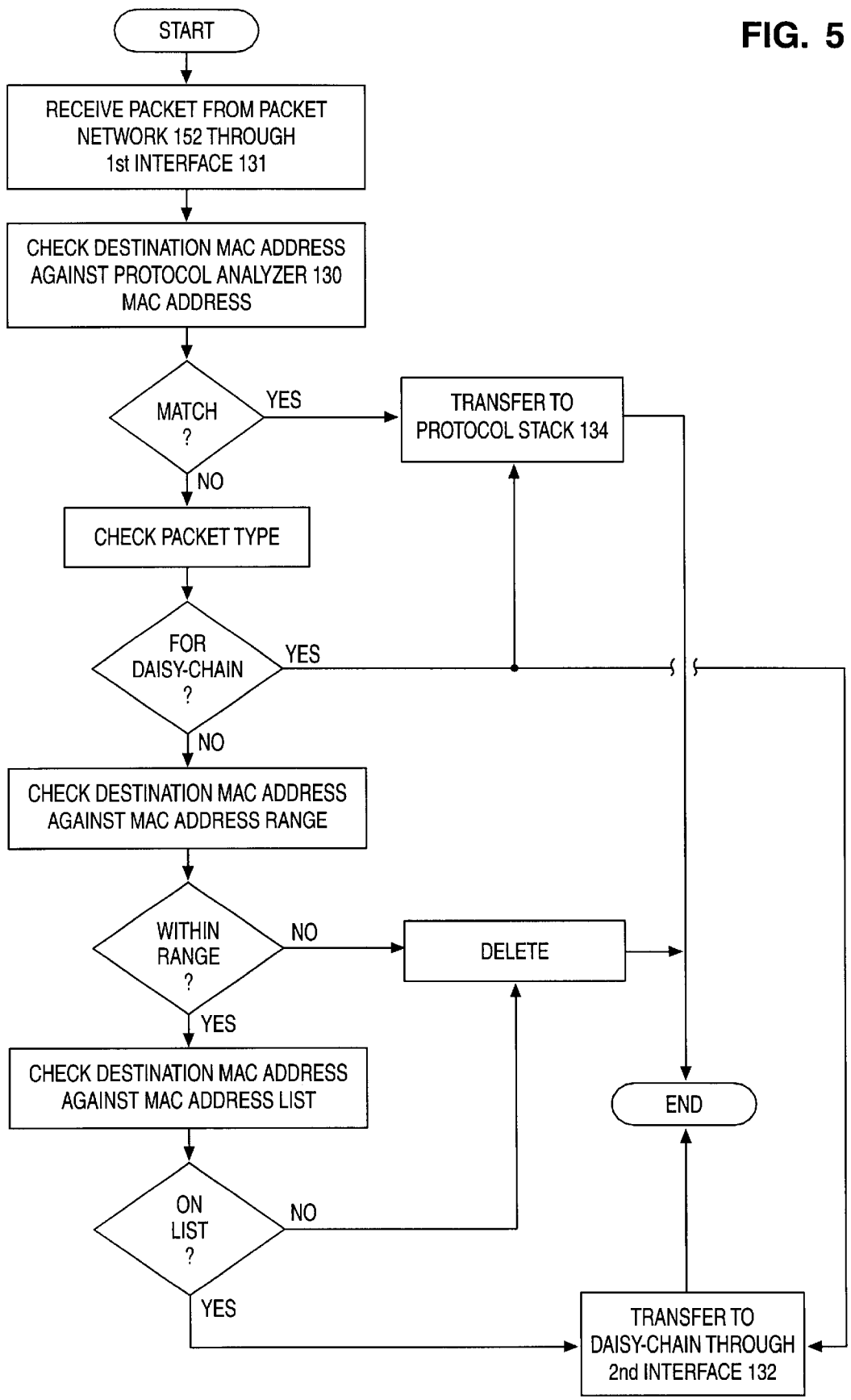
FIG. 5 is a flow diagram that illustrates the operation of a protocol analyzer in an example of the invention.

Protocol Analyzer Operation—FIGS. 3–5

FIGS. 3–5 depict a specific example of protocol analyzer operation in accord with the present invention. Those skilled in the art will appreciate numerous variations from this example that do not depart from the scope of the invention. Those skilled in the art will also appreciate that various features described below could be combined to form multiple variations of the invention.

FIGS. 3–5 illustrate the operation of the control system 133 in protocol analyzer 130 in an example of the invention. On FIG. 3, operation starts when a packet is received from the daisy-chain through second interface 132. The destination MAC address from the packet is checked for a match with the MAC address for protocol analyzer 130. Note that if protocol analyzers do not communicate with one another, then there is no need to check the destination MAC address for packets that are transferred in the direction toward packet network 152. If there is a match, then the packet is transferred to protocol stack 134. If there is not a match, then the packet is transferred to packet network 152 through first interface 131. The source MAC address from the packet is also added to a list. Over time, the address list indicates all of the devices in the daisy-chain that communicate with packet network 152.

On FIG. 4, operation starts when a packet is received from packet network 152 through first interface 131. The packet is stored in memory. The destination MAC address from the packet is checked for a match with the MAC address for protocol analyzer 130. If there is a match, then the packet is transferred to protocol stack 134. If there is not a match, then the type field of the packet is checked. If the type indicates that the packet should be passed to the daisy-chain, such as a broadcast type, then the packet is transferred to both protocol stack 134 and the daisy-chain through second interface 132. If the type does not indicate that the packet should be passed, then the destination MAC address from the packet is checked against a range of MAC addresses. If the destination MAC address from the packet is within the range, then the packet is transferred to the daisy-chain through second interface 132. If the destination MAC address from the packet is not within the range, then the destination MAC address from the packet is checked against the address list of MAC addresses. If the destination MAC address from the packet is on the address list, then the packet is transferred to the daisy-chain through second interface 132. If the destination MAC address from the packet is not on the address list, then the packet is deleted. The operation depicted on FIG. 4 can vary in different examples of the invention. There are three types of checks for packets from packet network 152: 1) packet type, 2) MAC range, and 3) MAC list. Any of these checks could be used by itself or in combination with one or both of the other checks.

FIG. 5 depicts another variation when a packet is received from packet network 152 through first interface 131. The destination MAC address from the packet is checked for a match with the MAC address for protocol analyzer 130. If there is a match, then the packet is transferred to protocol stack 134. If there is not a match, then the type field of the packet is checked. If the type indicates that the packet should be passed to the daisy-chain, such as a broadcast type, then the packet is transferred to protocol stack 134 and to the daisy-chain through second interface 132. If the type does not indicate that the packet should be passed, then the destination MAC address from the packet is checked against a range of MAC addresses. If the destination MAC address from the packet is within the range, then the destination MAC address from the packet is checked against the address list of MAC addresses. If the destination MAC address from the packet is on the address list, then the packet is transferred to the daisy-chain through second interface 132. If the destination MAC address from the packet is not within the range or is not on the address list, then the packet is deleted.

Those skilled in the art will appreciate variations of the above-described embodiments that fall within the scope of the invention. For example, devices other than protocol analyzers and addresses other than MAC addresses could be used to implement the invention. As a result, the invention is not limited to the specific examples and illustrations discussed above, but only by the following claims and their equivalents.

What is claimed is:

1. An apparatus comprising:
   a first protocol analyzer comprising
      a first interface configured to receive packets from a packet network connecting the first protocol analyzer to a test computer;
      a second interface configured to transfer packets from the first protocol analyzer to a second protocol analyzer; and
      a control system coupled to the first interface and the second interface and configured to either delete a respective packet received by the first interface from the packet network or transfer the respective packet to the second interface for transfer to the second protocol analyzer based on a destination address in the respective packet, to thereby transmit test packets from the test computer to the second protocol analyzer through the first protocol analyzer.

2. The apparatus of claim 1 wherein the control system is configured to transfer the respective packet to the second interface if the destination address is on an address list.

3. The apparatus of claim 2 wherein the control system is configured to compile the address list from source addresses in packets received by the second interface.

4. The apparatus of claim 1 wherein the control system is configured to transfer the respective packet to the second interface if the destination address is within an address range.

5. The apparatus of claim 1 wherein the control system is configured to transfer a different respective packet received by the first interface from the packet network to the second interface if the different respective packet has a pre-selected packet type.

6. The apparatus of claim 1 wherein the control system is configured to transfer a different respective packet received by the first interface from the packet network to a protocol stack for internal systems of the first protocol analyzer if the different respective packet has another destination address of the first protocol analyzer.

7. The apparatus of claim 1 wherein the destination address is a MAC address.

8. An apparatus comprising:
   a test system coupled to a packet network;
   a first protocol analyzer coupled to the packet network to receive packets from the test system through the packet network, and coupled to a daisy-chain of other protocol analyzers, the first protocol analyzer configured to receive packets from the packet network and either delete a received respective packet or transfer the respective packet to the daisy-chain based on a destination address in the respective packet, to thereby transmit test packets from the test computer to protocol analyzers in the daisy-chain through the first protocol analyzer.

9. The apparatus of claim 8 wherein the first protocol analyzer is configured to transfer the respective packet to the daisy-chain if the destination address is on an address list.

10. The apparatus of claim 9 wherein the first protocol analyzer is configured to compile the address list from source addresses in other packets received from the daisy-chain.

11. The apparatus of claim 8 wherein the first protocol analyzer is configured to transfer the respective packet to the daisy-chain if the destination address is within an address range.

12. The apparatus of claim 8 wherein the first protocol analyzer is configured to receive a different respective packet from the packet network and transfer the different respective packet to the daisy-chain if the different respective packet has a preselected packet type.

13. The apparatus of claim 8 wherein the destination address is a MAC address.

14. A method comprising:
   receiving a packet from a packet network into a first protocol analyzer, a test system being connected to the first protocol analyzer through the packet network; and
   based on a destination address in the received packet, either deleting the received packet or transferring the received packet to a second protocol analyzer by the first protocol analyzer, to thereby transmit test packets from the test computer to the second protocol analyzer through the first protocol analyzer.

15. The method of claim 14 wherein either deleting the received packet or transferring the received packet comprises transferring the received packet if the destination address is on an address list.

16. The method of claim 15 further comprising compiling the address list from source addresses in other packets received from the second protocol analyzer.

17. The method of claim 14 wherein either deleting the received packet or transferring the received packet comprises transferring the received packet if the destination address is within an address range.

18. The method of claim 14 further comprising receiving another packet from the packet network and transferring the other packet to the second protocol analyzer if the other packet has a pre-selected packet type.

19. The method of claim 14 further comprising receiving another packet from the packet network and transferring the other packet to a protocol stack for internal systems of the first protocol analyzer if the other packet has another destination address of the first protocol analyzer.

20. The method of claim 14 wherein the destination address is a MAC address.

21. An apparatus comprising:
   a first protocol analyzer connected to a test system through a packet network, the first protocol analyzer receiving packets from the packet network and, for a respective received packet, based on a destination address of the respective packet, deleting the respective packet or transferring the respective packet to a second protocol analyzer without transferring the respective packet back through the packet network, to thereby transmit test packets from the test computer to the second protocol analyzer through the first protocol analyzer.

22. An apparatus as in claim 21, wherein the second protocol analyzer is a respective protocol analyzer in a daisy chain of protocol analyzers.

23. An apparatus comprising:

a first protocol analyzer connected to a test system through a packet network, the first protocol analyzer receiving packets from the packet network and comprising, for a respective received packet and based on a destination address of the respective packet, means for deleting the respective packet or transferring the respective packet to a second protocol analyzer without transferring the respective packet back through the packet network, to thereby transmit test packets from the test computer to the second protocol analyzer through the first protocol analyzer.

\* \* \* \* \*